United States Patent [19]

Fairer et al.

[11] Patent Number: 5,189,799

[45] Date of Patent: Mar. 2, 1993

[54] LASER GONIOMETER

[75] Inventors: George M. Fairer, Boulder; James M. Boernge; David W. Harris, both of Lakewood; DeWayne A. Campbell, Littleton; Gene E. Tuttle, Littleton, Mark H. McKeown, Golden; Steven C. Beason, Lakewood, all of Colo.

[73] Assignee: The United States of America as represented by the Secretary of the Interior, Washington, D.C.

[21] Appl. No.: 748,015

[22] Filed: Jan. 30, 1991

Related U.S. Application Data

[63] Continuation of Ser. No. 340,119, Apr. 11, 1989, abandoned.

[51] Int. Cl.$^5$ .............................................. E01C 1/00
[52] U.S. Cl. ........................................ 33/281; 33/285; 33/DIG. 21; 356/138
[58] Field of Search ................ 33/281, 282, 285, 286, 33/DIG. 21, 1 E; 356/138, 140, 147

[56] References Cited

U.S. PATENT DOCUMENTS

| | | | |
|---|---|---|---|
| 2,592,941 | 4/1952 | Moore | 33/282 |
| 2,746,155 | 5/1956 | Churgin et al. | 33/281 |
| 3,469,919 | 9/1969 | Zellner | 33/281 |
| 3,471,234 | 10/1969 | Studebaker | 33/285 |
| 4,441,812 | 4/1984 | Feist | 356/147 |
| 4,566,202 | 1/1986 | Hamar | 33/286 |
| 4,580,345 | 4/1986 | Andrew | 33/DIG. 21 X |
| 4,752,126 | 6/1988 | Fujii | 33/285 |
| 4,988,192 | 1/1991 | Knittel | 33/DIG. 21 X |

FOREIGN PATENT DOCUMENTS

| | | | |
|---|---|---|---|
| 591688 | 2/1978 | U.S.S.R. | 356/147 |
| 1037071 | 8/1983 | U.S.S.R. | 33/281 |

Primary Examiner—William A. Cuchlinski, Jr.
Assistant Examiner—Alvin Wirthlin
Attorney, Agent, or Firm—E. Philip Koltos

[57] ABSTRACT

The laser goniometer is an apparatus which permits an operator to sight along a geologic feature and orient a collimated lamer beam to match the attitude of the feature directly. The horizontal orientation (strike) and the angle from horizontal (dip), are detected by rotary incremental encoders attached to the laser goniometer which provide a digital readout of the azimuth and tilt of the collimated laser beam. A microprocessor then translates the square wave signal encoder outputs into an ASCII signal for use by data recording equipment.

5 Claims, 1 Drawing Sheet

LASER GONIOMETER

STATEMENT OF GOVERNMENT INTEREST

The invention described herein may be manufactured and used by or for the Government of the United States of America for governmental purposes without the payment of any royalties thereon or therefore.

This application is a continuation of application Ser. No. 07/340,119 filed Apr. 11, 1989, now abandoned.

BACKGROUND OF THE INVENTION

This invention relates generally to a laser goniometer which allows the user to sight along a geologic feature and orient a laser to match the attitude of the feature directly. Accurate, dependable measurement of bearings and directions are required for geologic mapping in subterranean shafts, such as, for example, nuclear waste storage investigations. Subterranean sites presently being investigated are in rock with natural magnetism and also contain steel structures.

Previously, mapping of shafts could be done with extensive survey support to give geologists reference angles from which to measure the angles of the geologic features. This process was tedious and quite slow, resulting in high costs. Under these conditions, a surveyed reference (strike rail), is necessary with all directions or bearings related to the reference. Utilizing a conventional strike rail is time consuming and therefore extremely expensive. Previous methods consisted of obtaining bearings or directions from surveyed rails that had to be pre-positioned around the periphery of the work platform. This method is not compatible with a shaft sinking galloway. Magnetic compasses have been used but are not dependable.

The laser goniometer is not dependent on magnetic fields for determining the strike and dip of geologic features, as are more conventional geologic instruments such as the Brunton Compass. The laser goniometer relies on a surveyed reference rail and geometric means for obtaining strikes and dips, much as a surveying transit relies on reference points for determining angles of traverse. Formerly this would involve measuring the strike (orientation of the intersection of a geologic feature with a horizontal plane) by the use of a surveying transit and some type of protractor, and then using a Brunton Compass to measure the dip (angle from horizontal). The instant invention overcomes the deficiencies of the prior art by the use of a single instrument incorporating a collimated laser beam with a direct-reading base which can be indexed to a know reference specifically designed for use in measuring.

SUMMARY OF THE INVENTION

The instant invention overcomes the problems in the past by providing an accurate, movable, and easily transportable system for geologic mapping in subterranean shafts and tunnels. The unit is intended to be compatible with a typical galloway or working platform used in shaft construction. The laser goniometer of this invention is designed to be mounted on a reference rail (strike rail) of a known azimuthal direction. The base of the laser goniometer is set reload to the strike rail azimuth and measurements are read directly from the laser goniometer.

It is therefore an object of this invention to provide a laser goniometer assembly which is easily set up for use and then removed.

It is another object of this invention to provide a laser goniometer which is extremely useful in providing the strike and dip of geologic features for geologic mapping and bearing or direction determination.

It is till another object of this invention to provide a laser goniometer which is not dependent on magnetic fields for determining the strike and dip of geologic features.

A still further object of this invention is to provide a laser goniometer for accurate and simple measurement of the attitude of geologic features in environments where magnetic compasses and instruments will not perform or are inaccurate or undependable.

For a better understanding of the present invention, together with other and further objects thereof, reference is made to the following description taken in conjunction with the accompanying drawing and its scope will be pointed out in the appended claims.

DETAILED DESCRIPTION OF THE PREFERRED EMBODIMENT

Figure 1:
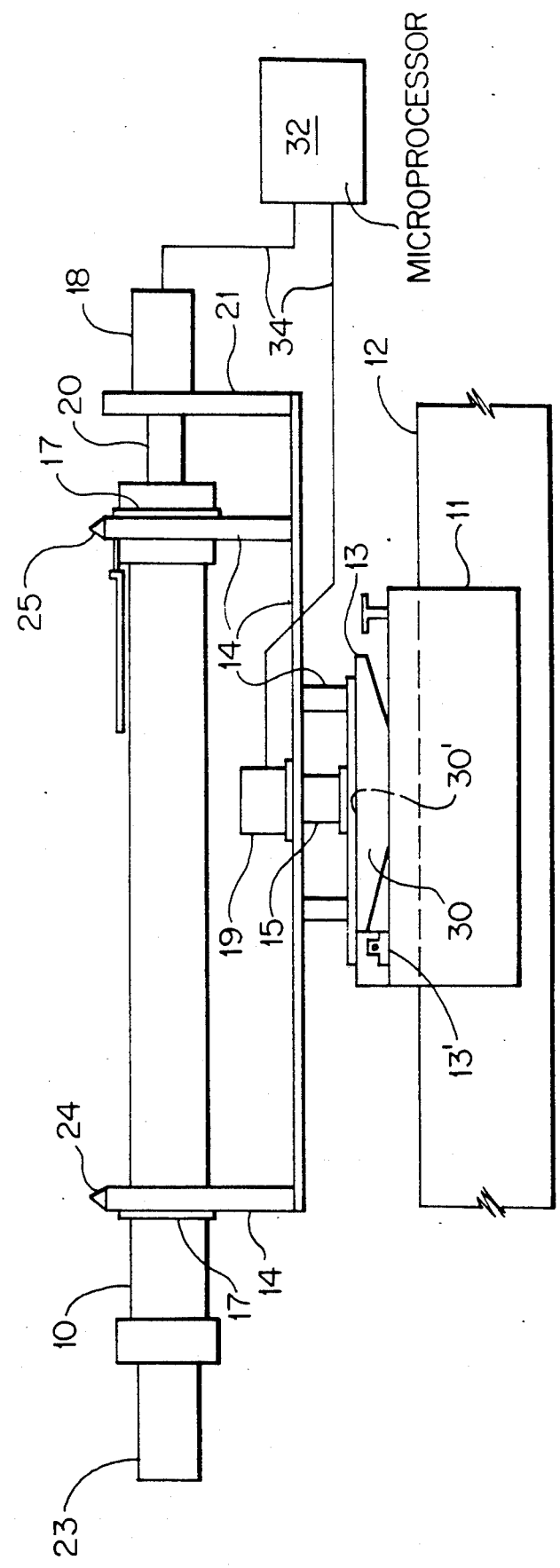
FIG. 1 is a side view of a laser goniometer assembly of the instant invention.

Reference is now made to FIG. 1 which shows a side view of the instant invention. The laser goniometer assembly of the instant invention utilizes a commercially available 8 milliwatt He-Ne laser 10 mounted via a rotating carriage 30 to base 11. Laser 10 is powered by a 110 volt AC power supply (not shown). Base 11 is mounted on and slides along a 2 inch high by 1 inch thick reference rail 12 which has known azimuthal direction. Rotating carriage 30 is rotatably mounted on base 11. The top surface 30' of rotating carriage 30 serves as a base for a support structure 14 which supports laser 10 such that, as rotating carriage 30 rotates with respect to base 11, laser 10 also rotates. Rotating carriage 30 includes an azimuth indexing ring 13, disposed around the periphery of the top surface 30' of carriage 30 which can be locked, by conventional means indicated by block 13', to base 11 such that, as carriage 30 rotates with respect to base 11, indexing ring 13 remains stationary. Since azimuth indexing ring 13 remains locked to base 11, the angle of rotation of laser 10 with respect to base 11 can be visually read from azimuth indexing ring 13. The azimuth indexing ring 13 can be constructed with a conventional circular horizontal scale (not shown) such as those designed for use with a surveying transit base.

Support structure 14 is constructed to allow laser 10 to rotate about the longitudinal axis of laser 10 through a vertical "tilt" (or dip) angle. Metal bearings 17 are provided within support structure 14 to insure smooth rotation of the laser 10.

Two conventional rotary incremental encoders 18 and 19 are attached to the laser goniometer assembly to measure the amount of rotation and tilt of laser 10 and to provide a digital signal output corresponding thereto. Rotary encoder 18 is attached to the rear of laser 10 by a small shaft 20 and supported by a bracket 21 extending from the rear of laser support structure 14. Rotary encoder 18 measures the vertical tilt angle of laser 10 by mechanically sensing the angle of rotation of laser 10 with respect to support structure 14. Rotary encoder 19 is coupled to a pivot shaft 15 which is fixed to base 11 and measures the azimuth of laser 10 by mechanically sensing the angle of rotation of rotating carriage 30 with respect to pivot shaft 15.

The front of laser 10 is fitted with a diverging lens 23 which operates to diverge the cylindrical laser beam output from the laser into a diverging, flattened substantially planar beam.

A microprocessor 32 is attached through signal cords 34 to rotary incremental encoders 18 and 19. Microprocessor 32 receives square wave signals output from encoders 18 and 19 and translates the output into a more usable ASCII signal for use by, for instance, data recording equipment (not shown).

SYSTEM OPERATION

The laser gonimeter of the instant invention is utilized by first positioning base 11 on reference rail 12 having a known azimuth, and orienting laser 10 with its long axis parallel to base 11 and its "tilt" (dip) angle set to a known horizontal reference. Microprocessor 32 is set, by conventional means, to calibrate the output of rotary encoder 19 with the known azimuth of reference rail 12 and to calibrate the output of rotary tilt encoder 18. Laser 10 is then rotated, around its long axis and horizontally, to align the planar laser beam with a geologic feature to be measured. Sights 24 and 25 are provided on the top of support structure 14 to facilitate the alignment process. The strike and dip of the geologic feature, corresponding to the azimuth and tilt of laser 10 measured by rotary encoders 18 and 19, can then be output from microprocessor 32 by conventional means such as a LED display (not shown).

While the invention has been described in its preferred embodiment, it is to be understood that the words which have been used are words of description rather than limitation and that changes may be made within the preview of the appended claims without departing from the true scope and spirit of the invention in its broader aspects.

What is claimed is:

1. Apparatus for providing a measure of azimuth and dip angles for geologic mapping, particularly where magnetic compasses are not appropriate, the apparatus comprising:
   a base,
   carriage means rotatably mounted on said base so as to enable rotation of said carriage means through azimuth angles,
   laser means, having a long axis and rotatably mounted on said carriage means so as to enable rotation of said laser means about said long axis through a dip angle, for producing a laser beam,
   a diverging lens means for receiving said laser beam and for causing said beam to diverge into a diverging substantially planar beam,
   first encoder means connected to said carriage means for generating a first output signal indicating the azimuth angle of the laser means, and
   second encoder means connected to said laser means for generating a second output signal indicating the dip angle of the laser means based on said laser means rotating about said long axis.

2. The apparatus according to claim 1, wherein said carriage means comprises a surveying transit circular horizontal scale.

3. The apparatus according to claim 1, wherein said first and second encoder means are connected to a microprocessor controller adapted to translate the encoder outputs into signals for use by data recording equipment.

4. The apparatus according to claim 3, wherein said encoder outputs are translated to ASCII signals for use by data recording equipment.

5. Apparatus for providing a measure of azimuth and dip angles for geologic mapping, particularly where magnetic compasses are not appropriate, the apparatus comprising:
   support means adapted to be mounted on a reference rail of known azimuthal orientation,
   carriage means rotatably mounted on said support means for rotation through an azimuth angle,
   laser beam generating means, having a long axis and mounted on said carriage means so as to rotate about said long axis through a dip angle for producing a laser beam,
   a diverging lens means for receiving said laser beam and for causing said beam to diverge into a diverging substantially planar beam,
   a first rotary incremental encoder, attached to said carriage means for generating a first output signal indicating the azimuth angel of the carriage means,
   a second rotary incremental encoder means, connected to said laser beam generating means for generating a second output signal indicating the dip angle of the laser means based on said laser beam generating means rotating about said long axis, and
   microprocessor controller means for translating said first and second output signals to ASCII signals for use by data recording equipment, said ASCII signals being indicative of the azimuth and dip angles of geologic features.

* * * * *